(12) United States Patent
Chapman

(10) Patent No.: US 7,946,542 B1
(45) Date of Patent: May 24, 2011

(54) ADJUSTABLE LAPTOP STAND FOR VEHICLE

(76) Inventor: Robert J. Chapman, Colorado Springs, CO (US)

( * ) Notice: Subject to any disclaimer, the term of this patent is extended or adjusted under 35 U.S.C. 154(b) by 775 days.

(21) Appl. No.: 11/946,646

(22) Filed: Nov. 28, 2007

(51) Int. Cl.
*F16M 11/00* (2006.01)
(52) U.S. Cl. ............ 248/122.1; 248/161; 248/918; 248/415
(58) Field of Classification Search ......... 248/122.1, 248/125.8, 125.1, 125.3, 125.7, 177.1, 188.5, 248/415, 161, 418, 918–920
See application file for complete search history.

(56) References Cited

U.S. PATENT DOCUMENTS

| | | | | |
|---|---|---|---|---|
| 4,165,856 | A | * | 8/1979 | Wiseheart ............ 248/449 |
| 4,946,120 | A | | 8/1990 | Hatcher |
| 5,485,793 | A | * | 1/1996 | Crowell ............ 108/44 |
| 5,673,628 | A | * | 10/1997 | Boos ............ 108/44 |
| 5,751,548 | A | * | 5/1998 | Hall et al. ............ 361/679.41 |
| 5,769,369 | A | * | 6/1998 | Meinel ............ 248/176.1 |
| 5,859,762 | A | * | 1/1999 | Clark et al. ............ 361/679.41 |
| 6,168,126 | B1 | * | 1/2001 | Stafford ............ 248/276.1 |
| 6,213,438 | B1 | * | 4/2001 | Ostby et al. ............ 248/276.1 |
| 6,315,252 | B1 | * | 11/2001 | Schultz ............ 248/160 |
| 6,382,745 | B1 | | 5/2002 | Adkins |
| 6,386,413 | B1 | | 5/2002 | Twyford |
| 6,585,201 | B1 | * | 7/2003 | Reed ............ 248/181.1 |
| 6,997,508 | B2 | | 2/2006 | Jaaska, Sr. |
| 7,032,872 | B2 | | 4/2006 | Sullivan |
| 7,233,487 | B2 | | 6/2007 | Stinson |

OTHER PUBLICATIONS

Gamber Johnson Scan of website showing prior art mounting systems manufactured by Gamber Johnson. Mounting systems shown are admitted prior art to current application by Applicant.
Stout Mount Consoles Brochure of prior art mounting systems manufactured by Havis-Shields. Mounting systems shown are admitted prior art to current application by Applicant.
'02-'07 Trailblazer/Envoy/'04-'07 Buick Ranier-425-5358 Scan of website showing prior art mounting system manufactured by Jotto Desk. Mounting system shown is admitted prior art to current application by Applicant.
Lund Industries Scan of website showing prior art mounting systems manufactured by Lund Industries. Mounting systems shown are admitted prior art to current application by Applicant.
Pro Desks Enforcer II Laptop Desk—Ford F Series F 250 F 350 F 450 Super Duty Scan of website showing prior art mounting system manufactured by Pro Desks. Mounting system shown is admitted prior art to current application by Applicant.
Ram Tough Dock Brochure of prior art mounting systems manufactured by Ram Mounts. Mounting systems shown are admitted prior art to current application by Applicant.
Troy Products Scan of website showing prior art mounting systems manufactured by Gamber Johnson. Mounting systems shown are admitted prior art to current application by Applicant.

* cited by examiner

*Primary Examiner* — Terrell McKinnon
*Assistant Examiner* — Steven M Marsh
(74) *Attorney, Agent, or Firm* — Patent Law Offices of Rick Martin, P.C.

(57) ABSTRACT

A laptop stand for a vehicle is rotatably secured to a post on or near the floor of the vehicle. It is usually mounted between a driver and a passenger seat on a custom bracket. Two handles can be loosened to quickly rotate both a base support rod and a cradle support rod to desired positions, either for the driver's use or the passenger's use. A tilt and a forward/backward adjustment is located under the cradle. A height adjustment is located on the base support rod.

16 Claims, 5 Drawing Sheets

ADJUSTABLE LAPTOP STAND FOR VEHICLE

FIELD OF INVENTION

The present invention relates to providing a stand that enables access to a laptop computer for both a driver and a passenger in a motor vehicle.

BACKGROUND OF THE INVENTION

Police cars are often supplied with a laptop computer which is generally mounted on a stand between the driver and the passenger seat. The present invention is used in any vehicle including utility trucks, ambulances, fire trucks and service vehicles. Gamber Johnson®, www.gamberjohnson.com, offers a variety of mounting systems for computer/communication systems in vehicles. A baseplate and a laptop with a battery pack weighs in at about eighteen pounds. Pro-Desks™, www.pro-desks.com offers an adjustable stand for this eighteen pound package. However, the dual arm support bracket exerts a large pressure along several joints before the laptop is secured by means of a bracket bolted onto the seat frame. This causes the laptop to wobble while the user is keying on the keyboard. This wobble causes errors.

What is needed in the art is a laptop stand with a secure base with a central mounting anchor post, a central vertical collar mounted on the anchor post, and a central mounting rod, with an arcuate top that supports the eighteen pound laptop package in a secure fashion during use. Adjustments for use by either the driver or the passenger are needed. The present invention meets all these needs and more.

SUMMARY OF THE INVENTION

The main aspect of the present invention is to provide a stiff but adjustable stand for a laptop, the stand being mounted between a driver and a passenger seat of a vehicle.

Another aspect of the present invention is to provide a height adjustment for the stand.

Another aspect is to provide a forward/back adjustment for the stand.

Another aspect is to provide a left/right adjustment for the stand.

Other aspects of this invention will appear from the following description and appended claims, reference being made to the accompanying drawings forming a part of this specification wherein like reference characters designate corresponding parts in the several views.

A base is fitted to a particular vehicle. Some bases straddle the forward hump of the vehicle, and some bolt to the seat frame. All bases provide a vertical mounting post around which slides a support collar. The support collar has a ratchet type set screw handle to allow a 360° rotation. The support collar has upper set screws to secure a vertical support rod which has a arcuate top to support a laptop cradle. The vertical support rod is adjusted to a selected height, and then the upper set screws are tightened to maintain that height.

The arcuate top of the vertical support rod supports a mini support rod, and it has a ratchet type set screw handle to provide a 360° rotation of a laptop cradle mounted on it. The cradle also has linear bearings to move forward/backward via a quick release pair of pinch arms. A handle provides a tilt adjustment. The eighteen pound laptop package is rigidly secured at a comfortable position for either a driver or a passenger to use. Two ratchet type set screw handles, a pair of pinch arms and a handle allow a change of use in seconds from a driver to a passenger.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
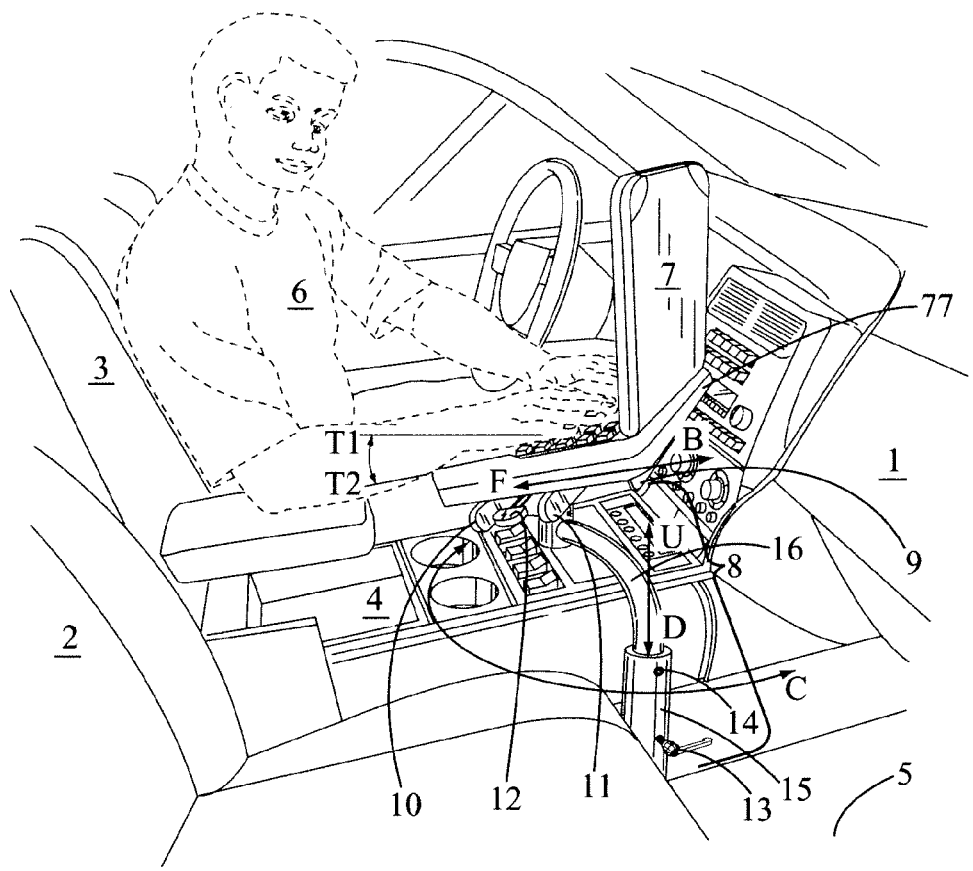
FIG. 1 is a passenger side perspective view of the preferred embodiment installed in a vehicle, wherein the laptop is adjusted for use by the driver.

Referring first to FIG. 1 the interior of car 1 has a passenger seat 2, a driver's seat 3, a center console 4, and a floor 5. The user 6 is keying on a laptop computer 7 which is mounted on stand 8.

A cradle 9 is connected to the base of the laptop 7, or as shown to a prior art docking station 77. Linear bearing allow the cradle 9 to be adjusted forward/backward shown by arrows F, B by pinching arms 10,11 together. Lifting to release and then depressing handle 12 provides a tilt adjustment. Loosening set screw handle 13 allows the mounting collar 15 to rotate on the anchor rod 21 FIG. 2, thereby enabling the laptop to rotate 360° shown by arrows C.

Loosening set screw 14 allows the rod 16 to be lifted up inside the mounting collar 15. Usually the driver 6 sets the up/down height, shown by arrows U, D using set screw 14, then leaves it there. The stand 8 can be removed from the base 20 by loosening handle 13.

Figure 2:
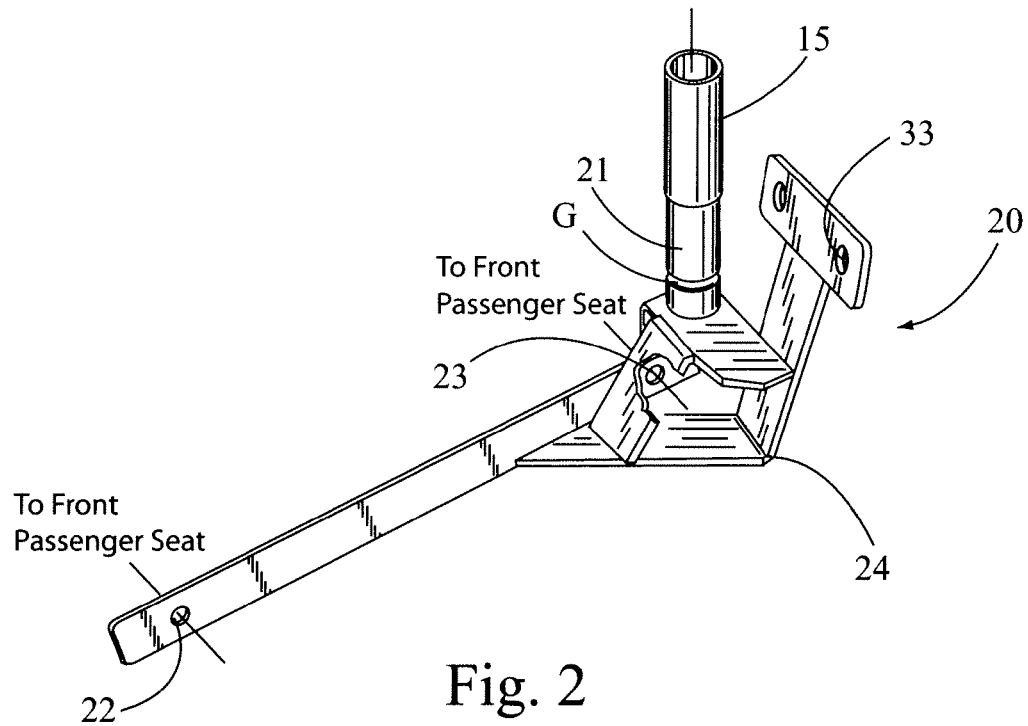
FIG. 2 is a side perspective view of a seat frame mounted base.

In FIG. 2 the base 20 is designed to bolt to a front passenger seat frame using holes 22, 23. An elbow 24 rests on the floor. The vertical mounting rod 21 is welded to the base 20. The mounting collar 15 of FIG. 1 could slip over the vertical mounting rod 21. Holes 33 provide a mount to a center hump.

Figure 3:
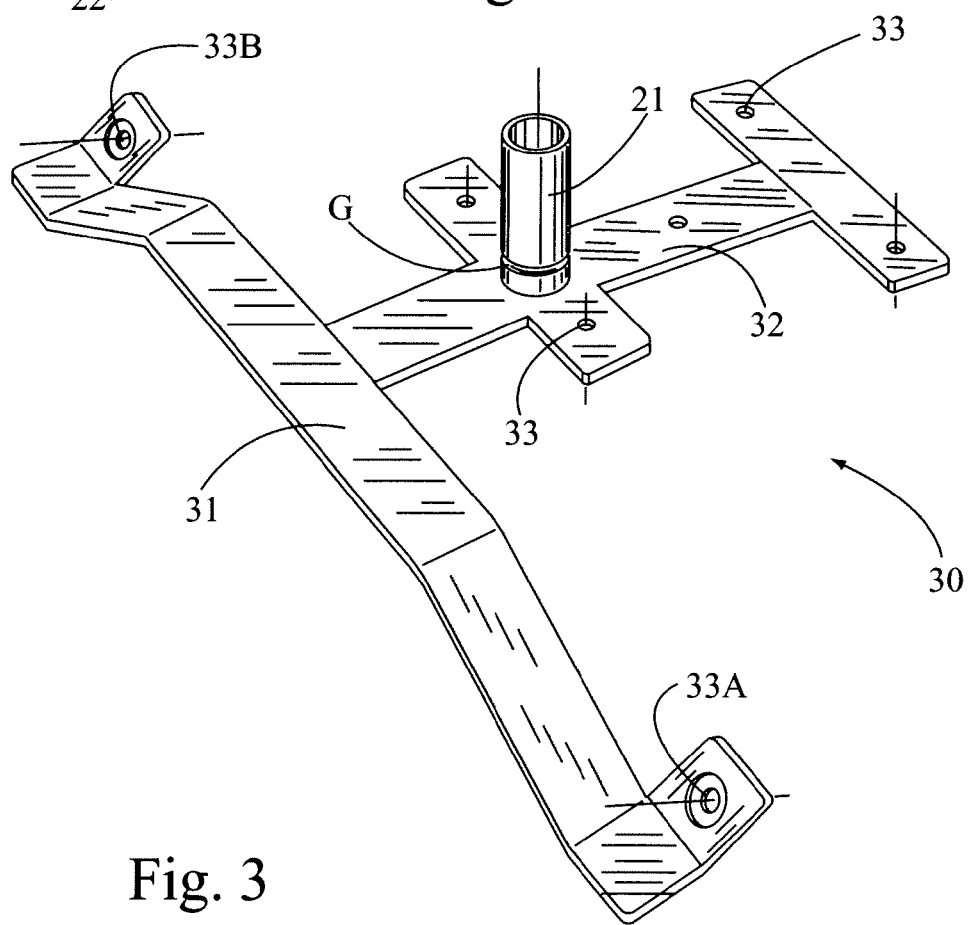
FIG. 3 is a side perspective view of an over the hump center floor mounted base.

In FIG. 3 a base 30 is suited to bolt to a vehicle floor. A bracket 31 can straddle a hump of the floor utilizing the passenger seat bolt and driver's seat bolt holes 33b, 33a respectively. Bracket 32 provides a plurality of mounting holes 33 for floor bolts. The vertical mounting rod 21 could support the mounting collar 15 of FIG. 1.

Figure 4:
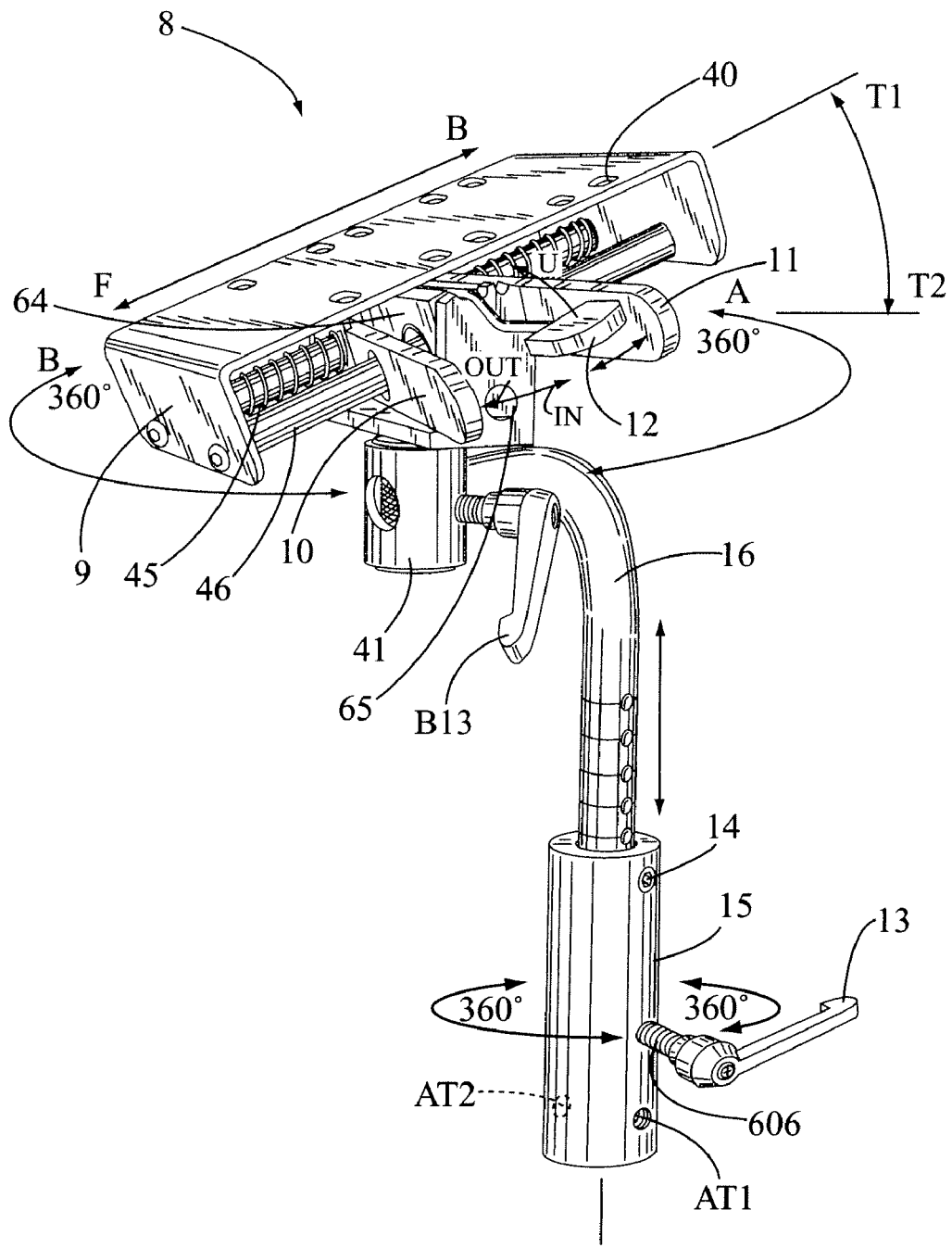
FIG. 4 is a front perspective view of the preferred embodiment.
Figure 5:
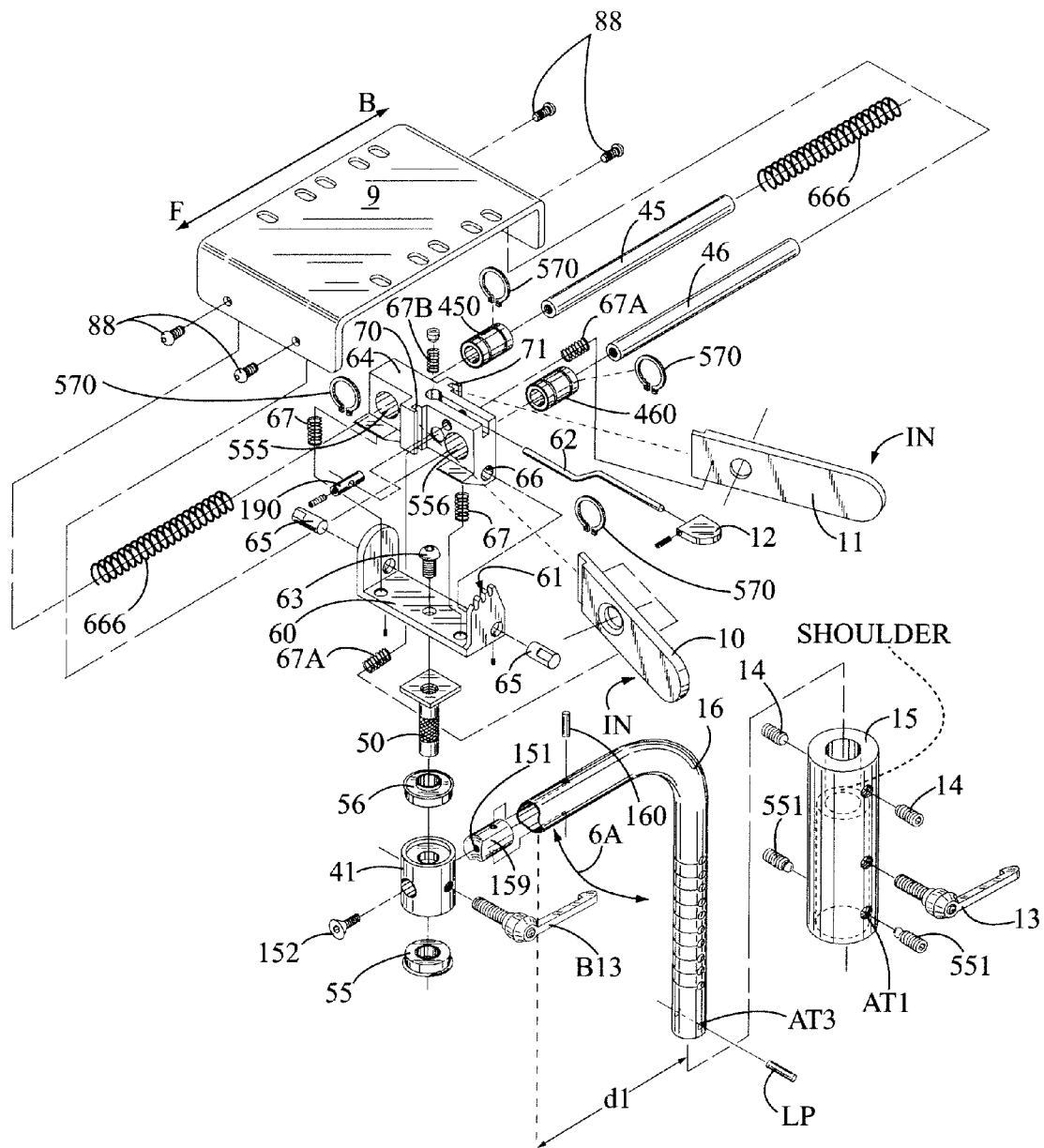
FIG. 5 is an exploded view of the FIG. 4 embodiment.

Referring next to FIG. 4 the mounting collar 15 rotates on a vertical mounting rod such as item 21 of FIG. 3. Handle 13 is a locking means which allows for a full 360° rotation of mounting collar 15 around mounting rod 21. The height of the rod 16 is generally set with two set screws 14 and left at one setting. However, if desired an additional handle 13 could be mounted at set screw 14, and the height could be adjusted more easily for different height settings. The upper end of rod 16 supports a pedestal 41 inside which is a mini vertical rod (FIG. 5, 50). This rod 50 supports the cradle 9, thereby providing a 360° rotation of cradle 9 on top of the rod 50 as shown by arrows B360°, FIG. 4. Handle 313 provides the locking adjustment at the desired angle. Arrows A360° indicate the rotation of rod 16 around post 21 via collar 15. Collar 15 is locked at a desired rotational angle by handle 13.

Arrows F, B represent forward and backward movement of the cradle 9 along linear bearings 45, 46. Squeezing pinching arms 10, 11 in direction shown by arrow IN, release the linear bearing to be adjusted. Arrow OUT indicates a spring return locked position for linear bearings 45, 46. Pushing handle 12 up in direction U releases the tilt assembly for adjustment for T1 to T2. Holes 40 allow various fasteners to secure a laptop or docking station.

Referring next to FIG. 5 pedestal 41 is secured to rod 16 via bolt 152 and threaded hole 151 in plug 159. Plug 159 is locked in place by roll pin 160. Bearings 55, 56 support the mini rod 50. A tilt base 60 has adjustment teeth 61 that secure tilt rod 62 at a desired tilt angle. Bolt 63 secures tilt base 60 to mini rod 50. Platform 64 pivots in tilt base 60 by means of pins 65 supporting the platform 64 in holes 66. Springs 67b assists a smooth transition along angles T2, FIG. 4. The springs 67 also bias the cradle 9 to a flat orientation when handle 12 is lifted in a locked position.

Platform 64 supports pinch handles 10, 11 in grooves 70, 71. Springs 67a force handles 10, 11 apart in a locked position. When the hand 10, 11 are moved in direction P, then the linear rods 45, 46 can slide through a linear bearings 450, 460 to desired front/back position.

Pan head bolts 88 secure to the linear bearings 45, 46 to the cradle 9. Pin 190 secures rod 62. Outer bearings 450, 460 are secured in holes 555, 556 in platform 64 by four snap rings 570. Springs 666 urge cradle 9 to a central position. Angle 6A is about a right angle. Dimension d1 is about 6 to 9 inches.

To conveniently use laptop 7 the user only needs to adjust handles B13, 13 to set up for the driver or the passenger. This adjustment can be done in seconds.

Figure 6:
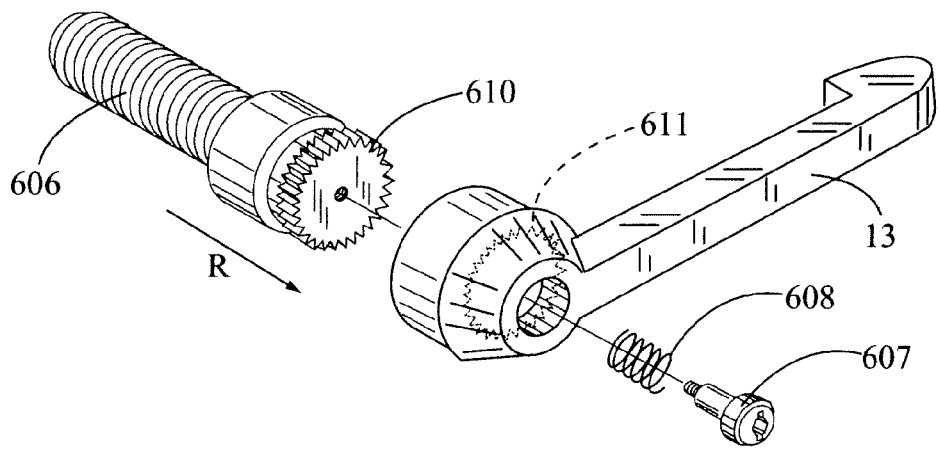
FIG. 6 (prior art) is an exploded view of a ratchet handle set screw.

Referring next to FIG. 6 the handle 13 is fastened to the set screw 606 with a bolt 607 and spring 608. When the handle 13 is pulled in direction R for release, the matching teeth in handle 13 numbered 611 are released from teeth 610, thereby enabling a free wheel turning of handle 13. This is called a stud adjustable lever. It allows tight adjustment with minimal movement of handle 13.

Shown is a prior art ⅜×0.16 stud, plastic adjustable lever.

Figure 7:
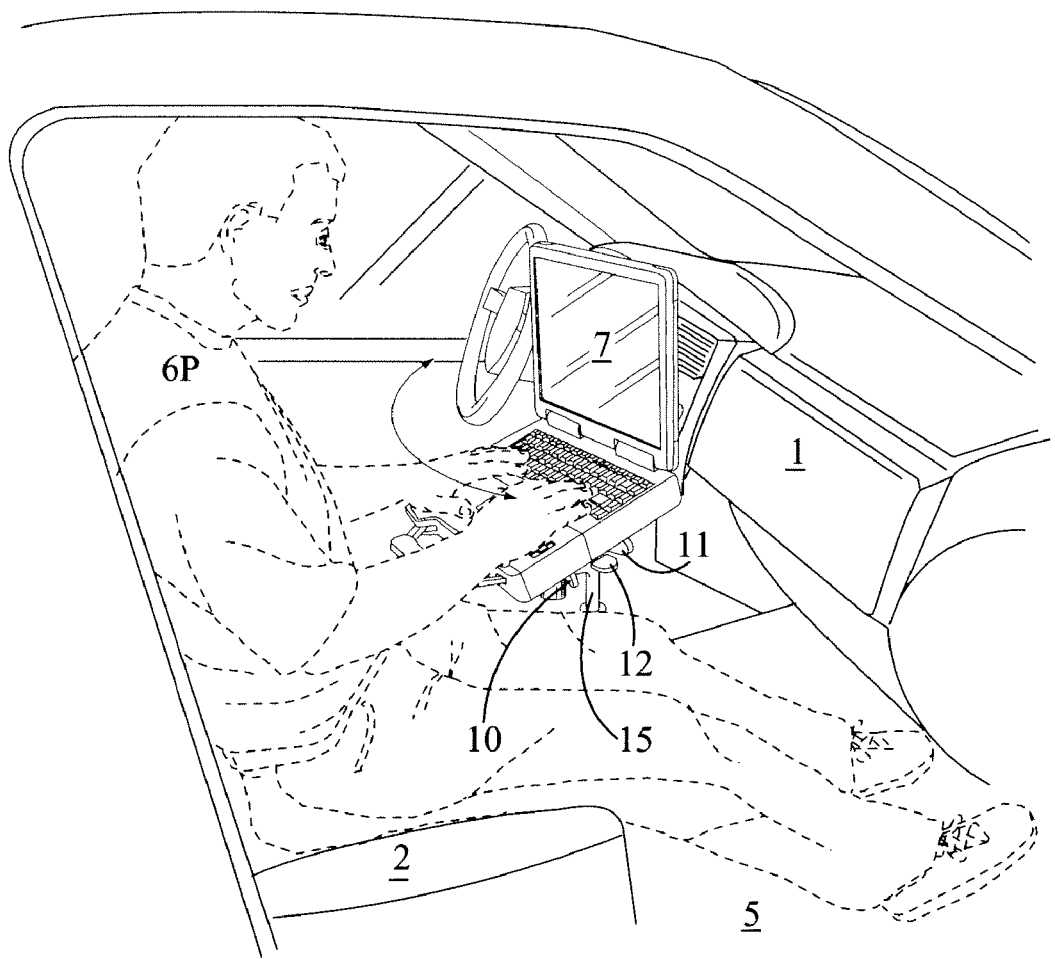
FIG. 7 is a passenger side perspective view of the stand in use.

Referring next to FIG. 7 a passenger 6P has adjusted handles 13 and B13 to conveniently use laptop 7. This adjustment can be done in seconds.

Optional anti theft features include the following. In FIGS. 2, 3, 5 several features are shown to deter a thief from pulling rod 16 right out of collar 15 and stealing the expensive laptop. Vertical mounting rod 21 has a groove G which receives a ball bearing seat screw(s) 551. Ball bearing set screws 551 are tightened into anti theft holes AT1, AT2 so as to insert the ball bearing tip into the groove G. All visible set screw holes, including AT1, AT2, can be sealed with a glue to deter easy access by a thief.

In order to prevent the rod 16 from being pulled out of the collar 15, collar 15 may be fitted with a shoulder, labeled SHOULDER, where in SHOULDER has a smaller inside diameter than the collar's bottom inside diameter. By installing a locking pin LP into anti theft hole AT3, locking pin LP hits SHOULDER so as to prevent the rod 16 from separating from the collar 15.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A vehicle stand for a laptop computer, the stand comprising:
   a base having a vertical support rod;
   a collar rotatably mounted over the vertical support rod with a first set screw enabling/disabling a rotation of the collar around the vertical support rod;
   a vertical mounting rod supported in an upper portion of the collar;
   a second set screw in the upper portion of the collar to enable a height adjustment of the vertical mounting rod in the collar;
   said vertical mounting rod having an arcuate upper segment and an upper distal mounting end;
   a pedestal mounted to the upper distal mounting end;
   said pedestal having a mini vertical support rod rotatably mounted therein;
   a third set screw in the pedestal enabling/disabling a rotation of the mini vertical support rod;
   a platform mounted atop the mini vertical support rod;
   a linear bearing assembly mounted to the platform;
   a cradle connected to a linear rod of the linear bearing assembly to provide a forward/backward movement of the cradle on the linear rod; and
   a lock on the linear rod to enable/disable the forward/backward movement of the cradle on the linear bearing.

2. The apparatus of claim 1, wherein the platform further comprises a tilt assembly having an adjustment means functioning to select a desired tilt angle for the cradle.

3. The apparatus of claim 1, wherein at least one of the first, second and third set screws has a ratchet type handle.

4. The apparatus of claim 2, wherein the arcuate upper segment further comprises about a right angle bend relative to the vertical mounting rod.

5. The apparatus of claim 2, wherein the lock on the linear bearing further comprises a pair of handles, each having a hole through which the linear rod can either slide when the holes are aligned, or lock when the holes are misaligned.

6. The apparatus of claim 1, wherein the vertical support rod further comprises an anti theft groove, the collar further comprises a hole which receives an anti theft set screw which projects into the anti theft groove, and the collar further comprises an inner shoulder which prevents a locking pin in the base of the vertical mounting rod from passing thereby.

7. A stand for a laptop computer mounted in a vehicle, the stand comprising:
   a vertical mounting post anchored adjacent a floor of a vehicle;
   a support collar rotatably mounted over the mounting post and having a lock means functioning to enable an adjustment of a rotational angle of the support collar relative to the post;
   a vertical mounting rod rotatably supported in an upper segment of the support collar;
   said vertical mounting rod having a mounting end extending outbound from a vertical axis of a lower portion of the vertical mounting rod;
   a pedestal mounted to the mounting end;
   said pedestal rotatably supporting a mini vertical support rod which supports a laptop computer;
   wherein the pedestal further comprises a lock means functioning to enable an adjustment of a rotational angle of the mini vertical support rod; and wherein the mini vertical support rod further comprises a platform mounted on its top, said platform having a linear bearing assembly which carries a cradle to an adjustable forward/backward position and said cradle supporting the laptop computer.

8. The apparatus of claim 7, wherein the platform further comprises a tilt assembly means functioning to provide an adjustable tilt angle for the laptop computer.

9. The apparatus of claim 7, wherein the linear bearing assembly further comprises a pair of pinch handles to lock and release a linear rod.

10. The apparatus of claim 7, wherein the vertical mounting rod and support collar further comprise a height adjustment assembly means functioning to raise and lower the vertical mounting rod to a desired height.

11. The apparatus of claim 7, wherein the lock means functioning to enable an adjustment of a rotational angle further comprises a set screw with a ratchet handle.

12. The apparatus of claim 7, wherein the mini vertical support rod and pedestal lock means further comprises a set screw lock having a ratchet handle.

13. The apparatus of claim 7, wherein the vertical mounting post further comprises an anti theft groove, the support collar further comprises a hole which receives an anti theft set screw which projects into the anti theft groove, and the support collar further comprises an inner shoulder which prevents a locking pin in the base of the vertical mounting rod from passing thereby.

14. A laptop computer stand comprising:
a rotating central vertical support rod;
said central vertical support rod having an upper bend portion to provide a mount outbound from a vertical axis of a lower portion of the central vertical support rod;
a lock means on the central vertical support rod functioning to provide an angular rotational adjustment for the central vertical support rod;
a pedestal connected to the mount on the central vertical support rod;
said pedestal having a mini central support rod supporting a platform;
said mini central support rod and pedestal having a rotational angle lock assembly;
said platform having a forward/backward carrier means functioning to adjust a forward/backward position of a carrier that supports a laptop computer; and
said platform further comprising a tilt assembly means functioning to provide a tilt angle for the carrier.

15. The apparatus of claim 14, wherein the forward/backward carrier means further comprises a linear bearing.

16. The apparatus of claim 14, wherein the lock means further comprises a base with a vertical post and a collar rotatably mounted around the vertical post and the vertical support rod housed in the collar and the vertical post further comprises an anti theft groove, the collar further comprises a hole which receives an anti theft set screw which projects into the anti theft groove, and the collar further comprises an inner shoulder which prevents a locking pin in the base of the central vertical support rod from passing thereby.

\* \* \* \* \*